UNITED STATES PATENT OFFICE.

WILLIAM E. GREENAWALT, OF DENVER, COLORADO.

PROCESS OF EXTRACTING METALS FROM THEIR ORES.

968,652.  Specification of Letters Patent.  Patented Aug. 30, 1910.

No Drawing.  Application filed January 16, 1906, Serial No. 296,402.  Renewed January 29, 1910. Serial No. 540,872.

*To all whom it may concern:*

Be it known that I, WILLIAM E. GREENAWALT, a citizen of the United States, residing at Denver, in the county of Denver and State of Colorado, have invented certain new and useful Improvements in Processes of Extracting Metals from Their Ores, of which the following is a specification.

My invention relates to improvements in processes of extracting metals from their ores.

It relates more particularly to copper ores and to ores containing copper with variable quantities of gold and silver, and also to copper ores containing variable quantities of lead, nickel, cobalt, etc. It is immaterial, whether any or all of these metals occur with the copper in its ores.

Wet methods of extracting copper from its ores have not met with the success that might be expected, owing largely to the high cost of acid for the solvent, and iron for the precipitant, which are the materials ordinarily used. Electrolytic precipitation, if the acid is regenerated, is an improvement; but since all ores consume much more acid than that combining with the copper, and since the regeneration of the acid is limited to that so combined, the necessity of supplying acid still exists.

Copper ores almost always contain variable quantities of gold and silver, and these metals cannot be recovered by any of the wet methods now in use. One, and sometimes two, additional treatments are necessary to extract the gold and silver. The difficulty with acid processes has been, that the acid is usually too expensive to admit of extended use in mining districts, which are ordinarily located far from the source of acid supply. Installation of acid plants at the mines has not solved the difficulty. It takes approximately 1.5 pounds of sulfuric acid to dissolve one pound of copper. If hydrochloric acid is used, it takes 0.6 pounds of acid to extract one pound of copper as cuprous, and 1.1 pounds as cupric chlorid. Much of the acid, whether sulfuric or hydrochloric, combines with the base elements in the ore and serves no useful purpose. The solution, as drawn from the ore, is usually acid; it is necessary therefore, to neutralize the free acid before precipitating the copper, if iron is used as the precipitant. If this precaution is not taken the solution will neutralize itself at the expense of the iron. It is evident, that the acid, which was provided at some expense, must be again neutralized at further expense, without having extracted any copper. The amount of acid which it is necessary to provide, is considerably more than that combining with the copper, and all the acid is irrecoverably lost. In some methods of extraction, the solution is reused after the copper has been precipitated by the iron, but these solutions are too slow in solvent action to admit of wide application.

Theoretically, 88.8 pounds of iron are required to precipitate 100 pounds of copper from sulfate solutions: In practice it takes from 200 to 300 pounds. Here again a large expense is incurred in providing iron to precipitate the copper. In commercial centers, where scrap iron is cheap, this item is serious enough; but in mining districts it is fatal to the cheap recovery of the copper. The copper precipitated by scrap iron is about 65% purity.

In my electrolytic process to be described, the copper is dissolved by dilute acid solutions, and then precipitated by electrolysis, while at the same time the acid, which was combined with the copper, is multiplied and regenerated as free acid, largely at the expense of sulfur dioxid and water. The regenerated acid solution is returned to the ore until the copper is sufficiently extracted. Sulfur dioxid, usually derived from roasting sulfid ore, is the active chemical consumed.

In working the process, the ore is first crushed to about 12 mesh. Sulfids are roasted, but the carbonates, oxids and silicates, may be treated without roasting. The ore is then placed in leaching vats for chemical treatment. The first step in the chemical treatment consists in combining chlorin, generated from common salt by electrolysis, with sulfur dioxid produced by roasting concentrates or sulfid ore. Two atoms of copper can in this way be extracted, while only one is possible when the chlorin is used direct. This may be shown by the following well known reactions:—

(1) $SO_2 + 2Cl + 2H_2O = H_2SO_4 + 2HCl$
(2) $H_2SO_4 + CuO = CuSO_4 + H_2O$ — 1 atom of copper
(3) $2HCl + CuO = CuCl_2 + H_2O$ — 1 atom of copper
(4) $2Cl + CuO + H_2O = CuCl_2 + H_2O + O$ — 1 atom of copper
(5) $3Cl + Au = AuCl_3$ Cupric chlorid, when warm and in the presence of base metal chlorids, acts readily on silver and its compounds to form silver chlorid, thus—

(6) $Ag + CuCl_2 = AgCl + CuCl$

From 80% to 90% of the silver may in this way be extracted, with the copper, even when the ore is given an oxidizing roast. If the ore contains considerable silver it is desirable to leach with a fairly concentrated solution of base metal chlorids.

The solubility of chlorin in water is limited. If a certain small amount is exceeded, the cheap handling of the ore and solution in vat leaching is almost impossible. By the indirect method of combining the chlorin and sulfur dioxid to form acids, any desired strength of solution may be obtained for the copper, and a chlorin solution of sufficient strength for the gold.

The cupric chlorid solution, issuing from the leaching vats, is then saturated with sulfur dioxid, ordinarily obtained from roasting sulfid ore. This converts the cupric chlorid into cuprous chlorid, thus—

(7) $2CuCl_2 + SO_2 + 2H_2O = 2CuCl + H_2SO_4 + 2HCl$

The object of this is:—

First:—The electric current precipitates twice as much copper from the cuprous as from the cupric solutions, and with an expenditure of only 65% of the energy per unit of copper.

Second:—The sulfur dioxid, combining with the cupric chlorid, produces large quantities of acid. A molecule of acid is in this way regenerated for every molecule of cupric chlorid reduced to cuprous chlorid. For every pound of copper reduced from the cupric to the cuprous condition, 1.4 pounds of acid is regenerated.

Third:—The excess of sulfur dioxid, combines with the chlorin liberated during electrolysis of the cuprous chlorid to precipitate the copper, thereby again regenerating 1.4 pounds of acid for every pound of copper reduced from the cuprous chlorid to metallic copper. The reaction is—

(8) $2CuCl = 2Cu + 2Cl$
(9) $2Cl + SO_2 + 2H_2O = H_2SO_4 + 2HCl$

Fourth:—It dispenses with the necessity of diaphragms in the electrolytic precipitating cells.

Insoluble anodes, precipitating metals from chlorid solutions, are vastly more durable than when precipitating from sulfate solutions.

It is evident, that in precipitating one pound of copper 2.8 pounds of acid are regenerated at the expense of sulfur dioxid and water. This amount of acid is capable of taking up twice the amount of copper from which it was precipitated. The regenerated acid solution is again applied to the ore, where some of the acid again combines with the copper, and some with the base elements, principally lime, forming the insoluble calcium sulfate which remains in the ore. The sulfuric acid is the one which is eliminated by combining with the base elements, while the hydrochloric acid combines with the copper, again resulting in the formation of the original cupric chlorid. This cycle of solution, precipitation and regeneration, is repeated indefinitely. When one vat of ore is sufficiently treated, the solution is turned into the next.

Cuprous chlorid is not soluble in water. If sulfur dioxid were applied to an ordinary water solution of cupric chlorid, the cuprous chlorid would be precipitated in fine white crystals. To obviate this, and to retain the cuprous chlorid in solution, a strong solution of metal chlorids, preferably sodium chlorid, is used with the acid as the solvent of the copper in extracting it from the ore. If the solution is warm and concentrated none of the cuprous chlorid will be precipitated on the application of sulfur dioxid.

All the metal chlorids have the faculty of displacing copper from its sulfate combinations. For example, if there is lime in the ore, as there usually is, both the sulfuric and hydrochloric acids may combine with it. If the hydrochloric combines with the lime, the result will be the formation of calcium chlorid; but the calcium chlorid will at once react with the copper sulfate in the solution and convert it into the cupric chlorid: thus—

(10) $CuSO_4 + CaCl_2 = CuCl_2 + CaSO_4$

The sodium chlorid in the solution, whether in the presence or absence of other base metal chlorids, will react with the cupric sulfate to form cupric chlorid, thus—

(11) $CuSO_4 + 2NaCl = CuCl_2 + Na_2SO_4$

It is evident therefore, that the sulfuric acid is the one which is eliminated by reacting with the base elements, and the sulfuric acid resolves itself back to the sulfur dioxid from the roasting furnace. The base metal chlorids act as a solvent for the silver chlorid.

If there is gold in the ore, the acid chlorid solution is charged with chlorin, generated from salt in the electrolytic cells. This chlorin is not lost, but is ultimately converted into base metal chlorid, in which form it is again used in the solution to extract the copper and silver from new charges of ore. Theoretically, none of the chlorin, whether free or combined, is lost. It simply changes its condition from acid to chlorid in the leaching vats and is again regenerated back to acid in the precipitating cells. In practice, it is well to allow one fourth pound of salt for every pound of copper produced.

The copper in the solution issuing from the leaching vats, will ordinarily be in the form of cupric chlorid; a small amount may be present as cuprous chlorid. The sulfate of copper which may be formed by the sulfuric acid, resulting from the regeneration, will be converted into the chlorid before issuing from the vats. It is desirable to have the copper in the form of chlorid before applying the sulfur dioxid. The sulfur dioxid is then applied to the solution to reduce the cupric to the cuprous chlorid. This is preferably done by subdividing the solution, as in a scrubbing tower, while passing the gas through it. There should also be a large excess of sulfur dioxid in the solution, to combine with the chlorin liberated during electrolysis, while precipitating the copper, as set forth in equations (8) and (9). The excess of sulfur dioxid, not only prevents the escape of chlorin, but also overcomes the tendency of the chlorin to reconvert some of the cuprous chlorid into the cupric chlorid. Should there be an excess of sulfur dioxid, after the solution has passed through the precipitating cells, it is again subdivided and brought into contact with chlorin to convert the excess into acid (according to equation 1) before again entering the leaching vat.

If there is silver in the ore, the solution containing cupric chlorid, is heated to convert the silver into the chlorid, and to more readily bring the chlorid of silver into solution. Hot salt water is a reasonably good solvent of silver chlorid, but a very impractical solvent for chlorin.

If the ore contains gold, the last charge of solution to be passed through the ore is cooled, subdivided, and as much chlorin as possible forced into it, so that the amount retained will be as large as possible. Chlorin is sparingly soluble in cold water, and much less soluble in warm water or in a solution of sodium chlorid. In order to get a strong solution of chlorin, I prefer using the methods set forth in my applications for Patent Serial Number 47,975 filed Feb. 19, 1901; Serial Number 144,363 filed Feb. 21, 1903; Serial Number 191,600 filed Feb. 1, 1904, which consist in general, of generating the chlorin from common salt by electrolysis, and bringing it in contact with the solution while in a state of subdivision, as in a scrubbing tower.

The regenerated solution contains other solvents of copper besides the acids. Among these may be mentioned ferric chlorid which will be found in the solution in considerable quantities. The ferric chlorid not only acts as a solvent for the copper, but also as an efficient chloridizer of the silver. The ferric chlorid also acts as an acid generator, thus—

(12) $Fe_2Cl_6 + SO_2 + 2H_2O = Fe_2Cl_4 + H_2SO_4 + 2HCl$

The ferrous chlorid is reconverted into the ferric chlorid in the precipitating tanks or in the chlorin tower. When the ore contains considerable gold and silver, and not much copper, this fact is taken advantage of, by not having an excess of sulfur dioxid in the solution before precipitating and letting the chlorin, released in precipitating the copper act on the ferrous chlorid to convert it into the ferric chlorid.

The chlorid solution is preferably composed largely of sodium chlorid. Other chlorids will gradually accumulate in considerable quantities. In the generation of chlorin from salt by electrolysis, caustic soda is produced at the same time. This caustic soda is added to the solvent of the copper from time to time, to purify it, by precipitating many of the base metals and regenerating sodium chlorid; thus;—

(13) $RCl_2 + 2NaOH = 2NaCl + R(OH)_2$

The precipitated hydroxids are then filtered from the solution.

When the ore contains copper, gold and silver, it is desirable that they be ultimately recovered separately. This may be done by precipitating the gold and silver by electrolysis, with the copper, and then redepositing the copper and recovering the gold and silver from the anode slimes. Both gold and silver will be deposited either before or simultaneously with the copper in the electrodeposition, since both require a lower voltage for the decomposition of their chlorids than that required for cuprous chlorid. These metals will therefore all be deposited together on the cathode. In the electrolytic refining of the crude cathode copper, as in the case of refining blister copper, the gold and silver will remain in the anode slimes while the pure copper is precipitated on the cathode. The gold and silver may then be recovered from the anode slimes by any of the well known methods. I prefer however, to recover the gold and silver by the method which I will now describe. It is well known that gold and silver are readily precipitated by metallic copper. If copper is precipitated by electrolysis, and with a high current density, it will not adhere to the cathode, but fall to the bottom of the cell as fine granular copper. Metallic copper is not readily soluble in dilute sulfuric or hydrochloric acid, if therefore, this granular precipitated copper is used to precipitate the gold and silver none of the excess of acid will be neutralized, as is the case when iron is used as the precipitant. To precipitate the gold and silver, the required amount of copper is precipitated with a current density to give the desired fineness. The copper is then placed in small tanks, arranged in series, one above the other, so that the solution issuing from the leaching vats, will pass in turn through the copper tanks, where the gold and silver are precipitated, and a corresponding amount of copper going into solution. The copper tanks are provided with suitable filters on which the copper is placed. When the copper is sufficiently rich in gold and silver, it is fluxed, melted, and cast into suitable anodes, the copper precipitated on suitable cathodes, and the gold and silver recovered from anode slimes. By this method of precipitating the gold and silver with the copper and then recovering the copper, with the copper in the solution obtained from the ore, the expense involved is almost a negligible factor, and the precious metals are readily, and separately recovered.

Having thus described my invention what I claim is:—

1. A process of extracting copper from its ores which consists in dissolving the copper with a suitable solvent; converting the copper in the solution, not already in the form of chlorid, into the chlorid by reacting with the chlorids in the solvent; converting the cupric chlorid into the cuprous-chlorid by bringing the solution in contact with sulfur dioxid; maintaining sufficient base metal chlorids in the solution to retain the cuprous chlorid in solution; electrolyzing the solution to precipitate the copper and regenerate acid; and then applying the regenerated acid solution to the ore to extract more copper.

2. A process of extracting copper from its ores which consists in bringing the copper in the ore in solution by means of a suitable solvent; converting the dissolved copper into the form of cuprous chlorid; maintaining sufficient other chlorids in the solution to retain the cuprous chlorid in solution; electrolyzing the cuprous chlorid in the presence of sulfur dioxid to precipitate the copper and regenerate acid; and then applying the regenerated acid solution to the ore to extract more copper.

3. A process of extracting copper from its ores which consists in leaching the ore with an acid solution of sodium chlorid; applying sulfur dioxid to the solution to convert the cupric chlorid into the cuprous chlorid thereby forming a solution of cuprous chlorid; electrolyzing the cuprous chlorid solution to precipitate the copper and regenerate acid; and then applying the regenerated acid solution to the ore to dissolve more copper.

4. A process of extracting copper from its ores which consists in treating the ore with an acid solution of sodium and other metal chlorids to dissolve the copper; applying sulfur dioxid to the copper solution to convert the cupric chlorid into the cuprous chlorid thereby forming a solution of cuprous chlorid; electrolyzing the cuprous chlorid solution in the presence of sulfur dioxid to precipitate the copper and regenerate acid; and then applying the regenerated acid solution to the ore to dissolve more copper.

5. A process of extracting metals from their ores containing copper, silver and gold which consists in bringing the copper and chlorid of silver in solution by means of a suitable solvent; converting the dissolved copper into the form of cuprous chlorid; maintaining sufficient other chlorids in solution to retain the cuprous chlorid in solution; electrolyzing the cuprous chlorid to precipitate the copper and regenerate acid; adding chlorin to the solution; and then applying the regenerated acid solution containing chlorin to the ore to extract the gold.

6. A process of extracting metals from their ores containing copper and gold which consists in treating the ore with an acid solution containing sodium and other chlorids to extract the copper; applying sulfur dioxid to the copper solution to convert the cupric into the cuprous chlorid thereby forming a solution of cuprous chlorid; electrolyzing the cuprous chlorid solution in the presence of sulfur dioxid to precipitate the copper and regenerate acid; adding chlorin to the precipitated solution; and then applying the regenerated acid solution containing chlorin to the ore to extract the gold.

7. A process of extracting metals from their ores containing copper and silver which consists in bringing the copper in the ore in solution by means of a suitable solvent; converting the dissolved copper not in the form of chlorid into the chlorid; converting the copper chlorid into the form of cuprous chlorid by the application of sulfur dioxid; maintaining sufficient other chlorids in the solution to retain the cuprous chlorid in solution and to dissolve the silver chlorid in the ore; electrolyzing the cuprous chlorid in the presence of sulfur dioxid to precipitate the copper and regenerate acid; applying chlorin to the precipitated solution to combine with the excess of sulfur dioxid; adding chlorin to the solution in excess; and then applying the regenerated acid solution containing chlorin to the ore to extract more metals.

8. A process of extracting metals from their ores containing copper and silver which consists in treating the ore with an acid solution containing sodium and other chlorids to dissolve the copper and silver chlorid; applying sulfur dioxid to the solution to convert the cupric into the cuprous chlorid thereby forming a solution of cuprous chlorid; electrolyzing the cuprous chlorid solution to precipitate the copper; electrolyzing salt to generate chlorin and caustic soda; adding the chlorin to the solution to dissolve the gold and other metals; and from time to time adding the caustic soda to the solution to purify it by precipitating many of the base metals as hydroxids and regenerating sodium chlorid.

9. A process of extracting metals from their ores containing copper which consists in electrolyzing sodium chlorid to generate chlorin and caustic soda; combining the chlorin with sulfur dioxid to generate acid; treating the ore with the acid solution so formed; converting the dissolved copper into cuprous chlorid by the application of sulfur dioxid; electrolyzing the cuprous chlorid to precipitate the copper; adding the caustic soda to the solution from time to time to purify it by precipitating many of the base metals as hydroxids and regenerating sodium chlorid; filtering the solution from the precipitated hydroxids; acidifying the solution; and then again applying the acid solution to the ore to extract more metals.

10. A process of extracting copper from its ores which consists in treating the ore with an acid solution containing sodium and ferric chlorids; applying sulfur dioxid to the resulting copper solution to convert the cupric chlorid into the cuprous chlorid and the ferric into the ferrous chlorid; electrolyzing the cuprous chlorid in the presence of ferrous chlorid to precipitate the copper; and then applying the regenerated solution to the ore to extract more copper.

11. A process of treating ores containing copper, silver, and gold which consists in applying an acid chlorid solution to the ore; heating the resulting cupric chlorid solution to chloridize the silver and dissolve it; applying sulfur dioxid to the solution to convert the cupric into cuprous chlorid; precipitating the copper; cooling the solution; applying chlorin to the cooled solution; and then returning the acid solution containing chlorin to the ore to extract the gold.

12. A process of extracting copper from its ores which consists in treating the ore with an acid solution containing sodium and other chlorids; filtering the solution from the ore; subdividing the solution; applying sulfur dioxid to the subdivided solution to convert the cupric chlorid into the cuprous chlorid; electrolyzing the cuprous chlorid to precipitate the copper and regenerate acid; and then applying the regenerated acid solution to the ore to dissolve more copper.

13. A process of extracting copper and other metals from their ores which consists in treating the ore with an acid solution containing sodium and other chlorids; filtering the solution from the ore; subdividing the solution; applying sulfur dioxid to the subdivided solution to convert the cupric chlorid into the cuprous chlorid; electrolyzing the cuprous chlorid to precipitate the copper and regenerate acid; subdividing the regenerated acid solution; applying chlorin to the subdivided solution; and then applying the regenerated acid solution containing chlorin to the ore to dissolve more metals.

14. A process of extracting metals from their ores containing copper which consists in subdividing an acid solution containing sodium and other chlorids; applying chlorin and sulfur dioxid to the subdivided solution; treating ores of copper with the solution so formed; applying sulfur dioxid to the solution to convert the cupric chlorid into the cuprous chlorid; electrolyzing the cuprous chlorid in the presence of sodium chlorid and sulfur dioxid to precipitate the copper and regenerate acid; and then applying the regenerated acid solution to the ore to extract more copper.

15. A process of extracting copper, gold, and silver from their ores containing copper, gold and silver which consists in treating the ore with an acid solution containing sodium and other chlorids; applying sulfur dioxid to the solution to convert the cupric into the cuprous chlorid thereby forming a solution of cuprous chlorid; electrolyzing a solution containing copper with sufficient current density to give a loose deposit of metallic copper; placing the copper in suitable receptacles; then passing the solution from the ore through the copper to precipitate the gold and silver.

16. A process of extracting metals from their ores containing copper, silver, and gold which consists in treating the ore with an acid solution containing sodium and other chlorids; precipitating the copper with sufficient current density to make a loose granular deposit of metallic copper; placing the copper so precipitated in suitable receptacles; passing the solution from the ore through the copper to precipitate the gold and silver; applying sulfur dioxid to the solution after issuing from the gold and silver precipitators; and then electrolyzing the solution to precipitate the copper.

17. A process of extracting copper from its ores which consists in treating the ore with an acid chlorid solution to dissolve the copper; applying sulfur dioxid to the resulting copper solution to convert the cupric chlorid into cuprous chlorid thereby forming a solution of cuprous chlorid; electrolyzing the cuprous chlorid solution in the presence of sulfur dioxid to precipitate the copper and regenerate acid; applying chlorin to the solution after leaving the electrolytic cells to convert the excess of sulfur dioxid into acid; and then applying the regenerated acid solution to the ore to dissolve more copper and repeating the cycle, as before, until the copper in the ore is sufficiently extracted.

18. A process of extracting copper from its ores which consists in treating the ore with an acid chlorid solution to dissolve the copper; applying sulfur dioxid to the resulting copper solution to convert the cupric chlorid into the cuprous chlorid thereby forming a solution of cuprous chlorid; electrolyzing the cuprous chlorid solution in the presence of sulfur dioxid to precipitate the copper and regenerate acid; electrolyzing an alkali metal chlorid to generate chlorin and caustic alkali; applying the chlorin so generated to a portion of the copper solution to convert the excess of sulfur dioxid in the copper solution, after leaving the electrolyzer, into acid; applying the caustic alkali to another portion of the copper solution to neutralize the acid and precipitate the base elements out of the solution; applying the purified and regenerated acid solution to the ore to dissolve more copper, and repeating the cycle, as before, until the copper in the ore is sufficiently extracted.

WILLIAM E. GREENAWALT.

Witnesses:
F. W. GIBBS,
THOMAS P. HUGHES.

---

Corrections in Letters Patent No. 968,652.

It is hereby certified that in Letters Patent No. 968,652, granted August 30, 1910, upon the application of William E. Greenawalt, of Denver, Colorado, for an improvement in "Processes of Extracting Metals from Their Ores," errors appear in the printed specification requiring correction, as follows: Page 2, line 3, first symbol in formula, the letters and numeral "$SO_2$," should read $SO_2$; same page, line 39, the symbol "$2H^aO$" should read $2H_2O$; same page, line 63, equation 9, should read $2Cl + SO_2 + 2H_2O = H_2SO_4 + 2HCl$ instead of "$2Cl + SO_2 + 2H_2SO_4 + 2HCl$", and same page, line 122, the symbol "$CuSo_4$" should read $CuSO_4$; and that the said Letters Patent should be read with these corrections therein that the same may conform to the record of the case in the Patent Office.

Signed and sealed this 27th day of September, A. D., 1910.

[SEAL.]

C. C. BILLINGS,
*Acting Commissioner of Patents.* its ores which consists in treating the ore with an acid chlorid solution to dissolve the copper; applying sulfur dioxid to the resulting copper solution to convert the cupric chlorid into cuprous chlorid thereby forming a solution of cuprous chlorid; electrolyzing the cuprous chlorid solution in the presence of sulfur dioxid to precipitate the copper and regenerate acid; applying chlorin to the solution after leaving the electrolytic cells to convert the excess of sulfur dioxid into acid; and then applying the regenerated acid solution to the ore to dissolve more copper and repeating the cycle, as before, until the copper in the ore is sufficiently extracted.

18. A process of extracting copper from its ores which consists in treating the ore with an acid chlorid solution to dissolve the copper; applying sulfur dioxid to the resulting copper solution to convert the cupric chlorid into the cuprous chlorid thereby forming a solution of cuprous chlorid; electrolyzing the cuprous chlorid solution in the presence of sulfur dioxid to precipitate the copper and regenerate acid; electrolyzing an alkali metal chlorid to generate chlorin and caustic alkali; applying the chlorin so generated to a portion of the copper solution to convert the excess of sulfur dioxid in the copper solution, after leaving the electrolyzer, into acid; applying the caustic alkali to another portion of the copper solution to neutralize the acid and precipitate the base elements out of the solution; applying the purified and regenerated acid solution to the ore to dissolve more copper, and repeating the cycle, as before, until the copper in the ore is sufficiently extracted.

WILLIAM E. GREENAWALT.

Witnesses:
F. W. GIBBS,
THOMAS P. HUGHES.

---

Corrections in Letters Patent No. 968,652.

It is hereby certified that in Letters Patent No. 968,652, granted August 30, 1910, upon the application of William E. Greenawalt, of Denver, Colorado, for an improvement in "Processes of Extracting Metals from Their Ores," errors appear in the printed specification requiring correction, as follows: Page 2, line 3, first symbol in formula, the letters and numeral "$SQ_2$," should read $SO_2$; same page, line 39, the symbol "$2H^aO$" should read $2H_2O$; same page, line 63, equation 9, should read $2Cl + SO_2 + 2H_2O = H_2SO_4 + 2HCl$ instead of "$2Cl + SO_2 + 2H_2SO_4 + 2HCl$", and same page, line 122, the symbol "$CuSo_4$" should read $CuSO_4$; and that the said Letters Patent should be read with these corrections therein that the same may conform to the record of the case in the Patent Office.

Signed and sealed this 27th day of September, A. D., 1910.

[SEAL.]

C. C. BILLINGS,
*Acting Commissioner of Patents.*

Corrections in Letters Patent No. 968,652.

It is hereby certified that in Letters Patent No. 968,652, granted August 30, 1910, upon the application of William E. Greenawalt, of Denver, Colorado, for an improvement in "Processes of Extracting Metals from Their Ores," errors appear in the printed specification requiring correction, as follows: Page 2, line 3, first symbol in formula, the letters and numeral "$SQ_2$" should read $SO_2$; same page, line 39, the symbol "$2H^aO$" should read $2H_2O$; same page, line 63, equation 9, should read $2Cl + SO_2 + 2H_2O = H_2SO_4 + 2HCl$ instead of "$2Cl + SO_2 + 2H_2SO_4 + 2HCl$", and same page, line 122, the symbol "$CuSo_4$" should read $CuSO_4$; and that the said Letters Patent should be read with these corrections therein that the same may conform to the record of the case in the Patent Office.

Signed and sealed this 27th day of September, A. D., 1910.

[SEAL.]

C. C. BILLINGS,
*Acting Commissioner of Patents.*